United States Patent
Salou et al.

(10) Patent No.: US 6,873,925 B2
(45) Date of Patent: Mar. 29, 2005

(54) CALCULATION METHOD OF STRAINS APPLIED BETWEEN A ROTATING PART AND A BEARING ON WHICH IT ROTATES

(75) Inventors: Arnaud Salou, Saint-Nazaire (FR); Olivier Blanchin, Annecy (FR)

(73) Assignee: S.N.R. Roulements, Annecy Cedex (FR)

( * ) Notice: Subject to any disclaimer, the term of this patent is extended or adjusted under 35 U.S.C. 154(b) by 34 days.

(21) Appl. No.: 10/431,471

(22) Filed: May 8, 2003

(65) Prior Publication Data

US 2003/0212521 A1 Nov. 13, 2003

(30) Foreign Application Priority Data

May 10, 2002 (FR) ............................................. 02 05804

(51) Int. Cl.[7] .............................................. G06F 19/00
(52) U.S. Cl. ......................................... 702/104; 702/85
(58) Field of Search .............................. 73/432.1, 862, 73/862.041, 862.042, 862.043, 862.381, 862.49; 702/33, 41, 42, 43, 85, 104, 189

(56) References Cited

U.S. PATENT DOCUMENTS

| | | | | |
|---|---|---|---|---|
| 4,027,539 A | * | 6/1977 | Halloran | ..................... 73/465 |
| 4,748,844 A | | 6/1988 | Yoshikawa et al. | ........... 73/146 |
| 4,941,105 A | * | 7/1990 | Marangoni | .................... 702/42 |
| 6,161,962 A | * | 12/2000 | French et al. | ............... 384/459 |
| 6,508,128 B2 | * | 1/2003 | Bode | ........................... 73/593 |
| 6,526,830 B2 | * | 3/2003 | Scholl et al. | ................. 73/593 |
| 6,687,623 B2 | * | 2/2004 | Bailey et al. | ................. 702/42 |
| 2003/0209085 A1 | * | 11/2003 | McDearmon et al. | .. 73/862.041 |

FOREIGN PATENT DOCUMENTS

| | | |
|---|---|---|
| EP | 0 432 122 A2 | 6/1991 |
| WO | WO 01/77634 | 10/2001 |

OTHER PUBLICATIONS

Fujii, Y; "Force Measurement Acting on the Moving Part of a Linear Air Bearing"; Proceedings of 41st SIC Annual Conference, SICE 2002; vol. 2; Aug. 5–7, 2002; pp 1031–1032.*

* cited by examiner

*Primary Examiner*—John Barlow
*Assistant Examiner*—Douglas N Washburn
(74) *Attorney, Agent, or Firm*—Arent Fox

(57) ABSTRACT

A method of calculating forces applied at an interface between a revolving element and a support on which the element revolves using a set of fixed sensors capable of delivering three independent signals representative of forces being applied on a fixed race of a bearing. The method is an iterative processing procedure and a calibration procedure, which is carried out before a first iteration of the processing procedure. The invention also applies such a method to the case of a tyre running on a road.

15 Claims, 7 Drawing Sheets

CALCULATION METHOD OF STRAINS APPLIED BETWEEN A ROTATING PART AND A BEARING ON WHICH IT ROTATES

The invention relates to a method of calculating the forces applied at an interface between a revolving element and a support on which said element revolves.

The invention applies in particular where the revolving element is a tyre mounted on the wheel of a motor vehicle, said tyre revolving on a road.

When it is wished to obtain the forces applied at the interface between the tyre and the road so as to know the dynamic performance model of the vehicle, it is possible, for example in accordance with the document FR-2 716 717, to integrate devices of dynamometer wheel type.

But these devices, besides their often deterrent cost within the context of an application in quantity for the automobile industry, have significant mechanical integration constraints, in particular on account of their using revolving transducers.

Besides these mechanical constraints which must be limited, it is also necessary to provide a method of calculating said forces which can be easily calibrated so as to be perfectly reliable.

The invention aims to solve these two types of problem by providing a method of calculating the forces mentioned above, said method using a set of fixed sensors, capable of being calibrated simply at the time it is brought into service, and implemented simply and reliably by means of an electronic computer.

Furthermore, the method according to the invention makes it possible to adapt the calculation of the forces to any deformation of the revolving element under the effect of said forces, which makes it possible to obtain a particularly reliable calculation over time.

Thus, by virtue of the invention, it is in particular possible to know at all times the dynamic performance of the vehicle so as to be able to control at least one motor vehicle driver assist system, for example of ABS (Antilock Brake System), TCS (Traction Control System), EBD (Electronic Brake force Distribution), ESP (Electronic Stability Program), ACC (Adaptive Cruise Control), EPS (Electric Power Steering), BAS (Brake Assist System) or BBW (Brake by Wire) type.

In particular, in an ABS type system, the method according to the invention makes it possible, by continuously and reliably calculating the forces applied on the tyre, to contribute towards shortening the braking distances by making it possible to control the braking of the wheels just before they lock, which corresponds to the optimum braking situation.

To that end, and according to a first aspect, the invention proposes a method of calculating the forces $F_{xw}$, $F_{yw}$, $F_{zw}$ applied at an interface Q between a revolving element and a support on which said element revolves about an axis Y, said element being associated with the rotating race of a bearing so as to revolve jointly therewith, said method using a set of fixed sensors capable of delivering three independent signals $S_1$, $S_2$, $S_3$ representative of the forces being applied on the fixed race of the bearing and which result from the forces $F_{xw}$, $F_{yw}$, $F_{zw}$, said method comprising:

the iterative processing procedure providing the following steps:
acquisition of the signals $S_1$, $S_2$, and $S_3$;
solving of the system (S) $S_i=(A_i \times F_{xw})+(B_i \times F_{yw})+(C_i \times F_{zw})+k_i$ with i=1 to 3 so as to obtain the values of $F_{xw}$, $F_{yw}$ and $F_{zw}$ corresponding to each acquisition; and the calibration procedure which is carried out before the first iteration of the processing procedure and which provides the following steps:
determination of the constants $k_i$;
application at a given interface $Q_1$ of successively three given forces $F_1$, $F_2$ and $F_3$, so as to determine, by acquisition of the signals $S_i$ and solving of the corresponding systems (S), parameters $A_i$, $B_i$ and $C_i$.

According to a second aspect, the invention proposes an application of such a method to calculation of the forces $F_{xw}$, $F_{yw}$, $F_{zw}$ applied on the tyres of a motor vehicle, said tyre revolving on a road.

Other objects and advantages of the invention will emerge in the course of the following description, given with reference to the accompanying drawings, in which.

Figure 1:
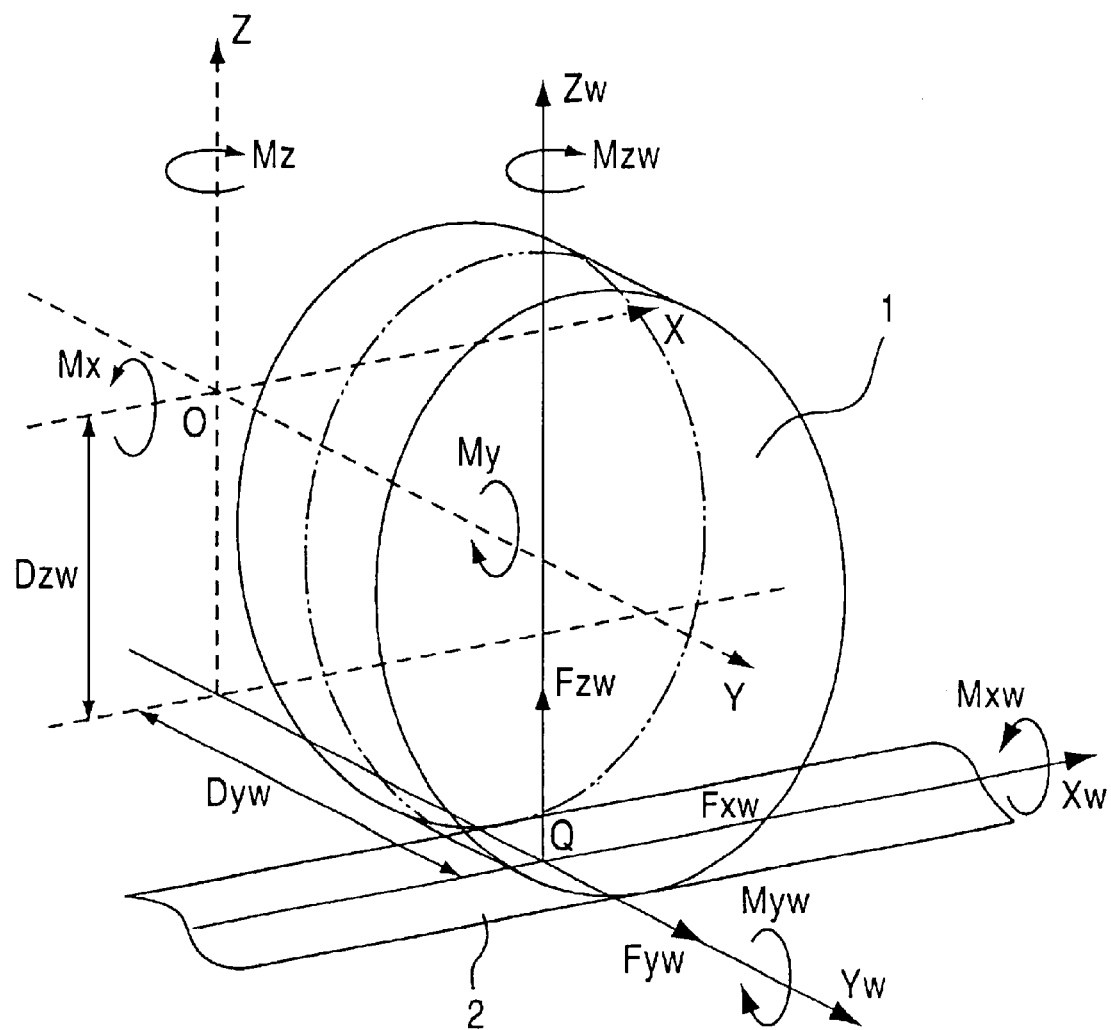
FIG. 1 is a perspective diagram of an element revolving on a support, said diagram showing the geometrical conventions used.

FIG. 1 depicts schematically an element 1 revolving on a support 2. In one particular example, the element 1 is a motor vehicle tyre mounted on the rim of a wheel 3 and the support 2 represents the road on which the vehicle is running.

In a known manner, the wheel 3 is mounted able to rotate with respect to the vehicle by means of a bearing comprising a rotating inner race with which the wheel 3 is associated, a fixed outer race associated with the vehicle and rolling bodies disposed between said races so as to allow rotation about an axis Y.

Under the effect of the running of the vehicle on the road, forces $F_{xw}$, $F_{yw}$, $F_{zw}$ and moments $M_{xw}$, $M_{yw}$, $M_{zw}$ are generated at the interface Q between the tyre 1 and the road 2. It should be noted that, in view of the deformations of the revolving element 1 able to be caused by the forces, the interface Q is not necessarily positioned at the centre of said element but can be defined as the intersection between the plane of the revolving element 1 and the vertical projection of the axis of rotation on the support 2.

According to the invention, provision is made for a set of fixed sensors which are capable of delivering three independent signals $S_1$, $S_2$, $S_3$ representative of the forces being applied on the fixed race and which result from the forces $F_{xw}$, $F_{yw}$ and $F_{zw}$, said signals being processed by an electronic computer so as to allow the calculation of the forces $F_{xw}$, $F_{yw}$ and $F_{zw}$.

Reference can be made for example to the documents FR-2 812 356 and FR-2 812 355 originating from the applicant which describe respectively a bearing and an assembly provided with such a set of sensors.

Such a set of sensors can be provided on each wheel of the vehicle so as to independently know, by implementing the invention on each of them, their dynamic performance. To that end, a central computer can be envisaged for independently processing the signals $S_1$, $S_2$, $S_3$ originating from each set of sensors.

In connection with FIG. 1, the following are defined:
the direct orthogonal reference frame $(X_w, Y_w, Z_w)$ centred at the interface Q, said reference frame being associated with the revolving element 1;

the direct orthogonal reference frame (X, Y, Z) centred on the point O substantially disposed on the axis of the bearing, the plane (X, Y) being parallel to the plane of the support 2 on which the running takes place and the plane (X, Z) being a median plane of the element on which the set of sensors is disposed.

The torque of the external loads being applied on the revolving element 1 at the point Q can then be written:

$$T_Q = \begin{bmatrix} F_{xw} & M_{xw} \\ F_{yw} & M_{yw} \\ F_{zw} & M_{zw} \end{bmatrix}_Q$$

$F_{xw}$, $F_{yw}$ and $F_{zw}$ being respectively the longitudinal, transverse and vertical forces which are applied on the revolving element 1; $M_{xw}$, $M_{yw}$ and $M_{zw}$ being respectively the moment of tilt tending to make the element 1 pivot about the axis $X_w$, the moment of roll tending to make the element 1 pivot about the axis $Y_w$ and the moment of alignment tending to make the element 1 pivot about the axis $Z_w$.

It is possible, whilst obtaining satisfactory results, to consider that the moments $M_{xw}$, $M_{yw}$ and $M_{zw}$ are negligible compared with the corresponding forces $F_{xw}$, $F_{yw}$ and $F_{zw}$.

The tensor is then written:

$$T_Q = \begin{bmatrix} F_{xw} & 0 \\ F_{yw} & 0 \\ F_{zw} & 0 \end{bmatrix}_Q$$

Posing, as it appears in FIG. 1, that the vector OQ has the coordinates $(0, D_{yw}, -D_{zw})$ in the reference frame (X, Y, Z), the tensor of the forces $T_Q$ transferred to the point O becomes:

$$T_O = \begin{bmatrix} F_{xw} & (D_{yw} \times F_{zw} + D_{zw} \times F_{yw}) \\ F_{yw} & 0 \\ F_{zw} & -(D_{yw} \times F_{xw}) \end{bmatrix}_O$$

This is because, by making the assumption that the bearing is a perfect pivot connection, that is to say by neglecting the friction internal to the bearing, the torque created by the longitudinal force $F_{yw}$ is zero at the point O about the axis Y.

In accordance with the invention, the signals $S_1$, $S_2$ and $S_3$ are expressed as being a function of the elements of the force torque $T_o$, the contribution of said elements being weighted by a constant coefficient for each element of the torque.

That is to say, the system (S) originating from the torque $T_o$ can be written:

$S_1 = a_1 F_{xw} + b_1 F_{yw} + c_1 F_{zw} + d_1(D_{yw} \times F_{zw} + D_{zw} \times F_{yw}) + f_1(D_{yw} \times F_{xw}) + k_1$ $S_2 = a_2 F_{xw} + b_2 F_{yw} + c_2 F_{zw} + d_2(D_{yw} \times F_{zw} + D_{zw} \times F_{yw}) + f_2(D_{yw} \times F_{xw}) + k_2$ $S_3 = a_3 F_{xw} + b_3 F_{yw} + c_3 F_{zw} + d_3(D_{yw} \times F_{zw} + D_{zw} \times F_{yw}) + f_3(D_{yw} \times F_{xw}) + k_3$ The coefficients $a_i$, $b_i$, $c_i$, $d_i$ and $f_i$ being constants specific to the sensors and therefore independent of the position of the interface Q.

The system (S) can also be written in the form:

$S_1 = (a_1 + f_1 \times D_{yw}) F_{xw} + (b_1 + d_1 \times D_{zw}) F_{yw} + (c_1 - d_1 \times D_{yw}) F_{zw} + k_1$ $S_2 = (a_2 + f_2 \times D_{yw}) F_{xw} + (b_2 + d_2 \times D_{zw}) F_{yw} + (c_2 - d_2 \times D_{yw}) F_{zw} + k_2$ $S_3 = (a_3 + f_3 \times D_{yw}) F_{xw} + (b_3 + d_3 \times D_{zw}) F_{yw} + (c_3 - d_3 \times D_{yw}) F_{zw} + k_3$ Posing the parameters:

$A_i = (a_i + f_i \times D_{yw})$ $B_i = (b_i + d_i \times D_{zw})$ $C_i = (c_i - d_i \times D_{yw})$ with i=1 to 3, the system (S) can be written in the form:

$S_1 = A_1 \times F_{xw} + B_1 \times F_{yw} + C_1 \times F_{zw} + k_1$ $S_2 = A_2 \times F_{xw} + B_2 \times F_{yw} + C_2 \times F_{zw} + k_2$ $S_3 = A_3 \times F_{xw} + B_3 \times F_{yw} + C_3 \times F_{zw} + k_3$ This writing makes it possible to simplify the equations and express the signals $S_1$, $S_2$, $S_3$ solely as a function of the forces $F_{xw}$, $F_{yw}$, $F_{zw}$.

The solutions of this system are then written:

$$\begin{bmatrix} F_{xw} \\ F_{yw} \\ F_{zw} \end{bmatrix} = \frac{1}{\det(M)} \begin{bmatrix} (B_2 C_3 - B_3 C_2) & (B_3 C_1 - B_1 C_3) & (B_1 C_2 - B_2 C_1) \\ (B_3 C_1 - B_1 C_3) & (A_1 C_3 - A_3 C_1) & (A_1 B_3 - A_3 B_1) \\ (A_2 B_3 - A_3 B_2) & (A_3 B_1 - A_1 B_3) & (A_1 B_2 - A_2 B_1) \end{bmatrix} \begin{bmatrix} (S_1 - k_1) \\ (S_2 - k_2) \\ (S_3 - k_3) \end{bmatrix}$$

with det $(M) = A_1 B_2 C_3 + A_2 B_3 C_1 + A_3 B_1 C_2 - A_3 B_2 C_1 - A_1 B_3 C_2 - A_2 B_1 C_3$ It is therefore possible, by solving the system (S), to calculate the values of the forces $F_{xw}$, $F_{yw}$, $F_{zw}$ from the measured signals $S_1$, $S_2$, $S_3$.

To do this, it is then necessary to determine the constants $k_i$ and the parameters $A_i$, $B_i$, $C_i$ with i=1 to 3.

This determination is carried out initially during a calibration procedure which is carried out prior to bringing into service of the device for calculating the forces $F_{xw}$, $F_{yw}$, $F_{zw}$, or selectively, for example during maintenance of the vehicle.

To that end, the calibration procedure comprises, as the first step, the determination of the constant $k_i$ with i=1 to 3 which can be carried out under zero force by measuring the signals $S_1$, $S_2$, $S_3$ which are then equal respectively to $k_1$, $k_2$, $k_3$, said values of $k_i$ then being either saved in the computer or cancelled out by adjusting the offset of the sensors, for example in the EEPROM of the computer, so as to cancel out the signals $S_1$, $S_2$, $S_3$ under zero torque.

Figure 4:
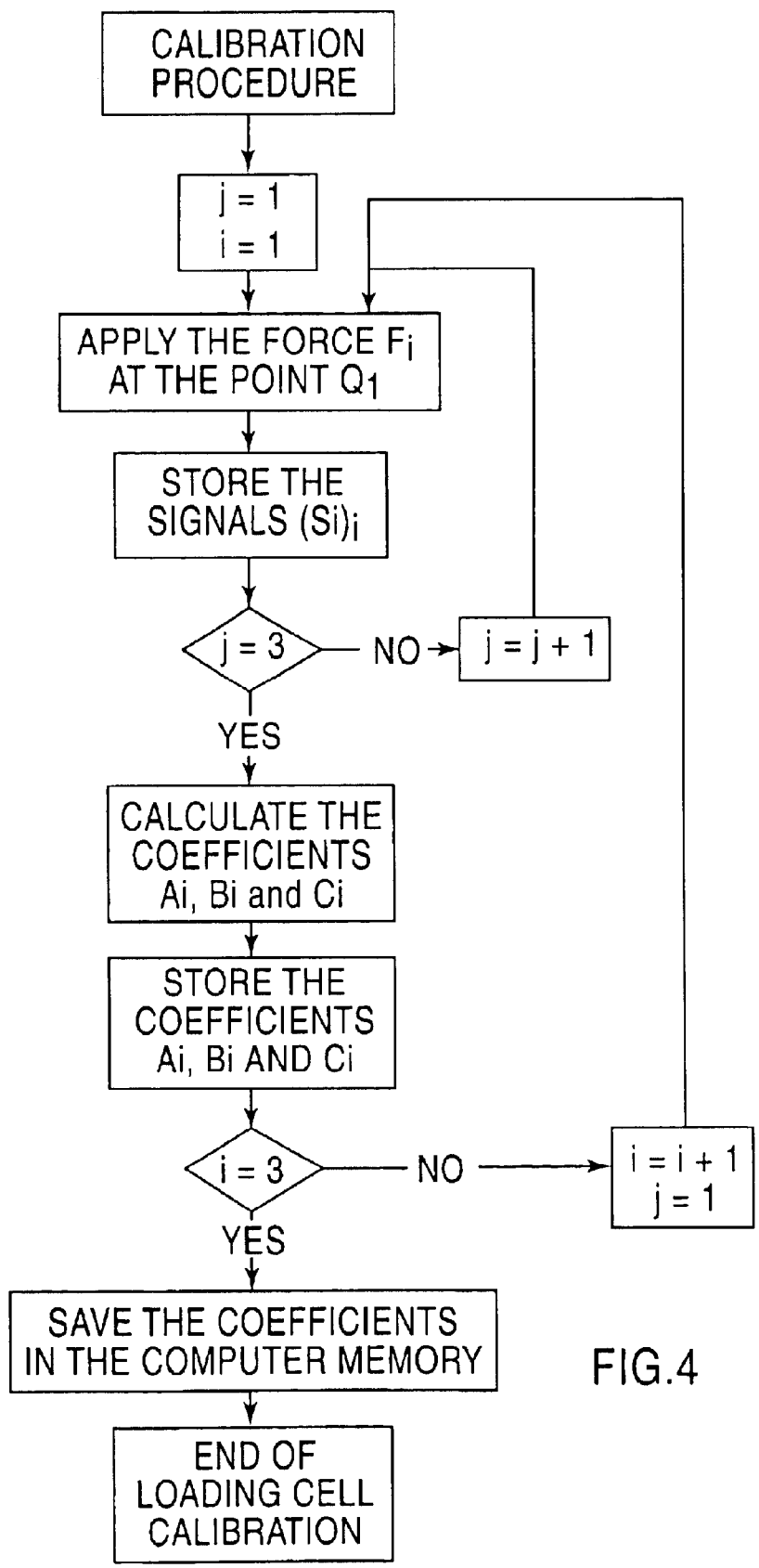
FIGS. 4 and 5 are overview diagrams of respectively first and second embodiments of a step of the calibration procedure.
Figure 5:
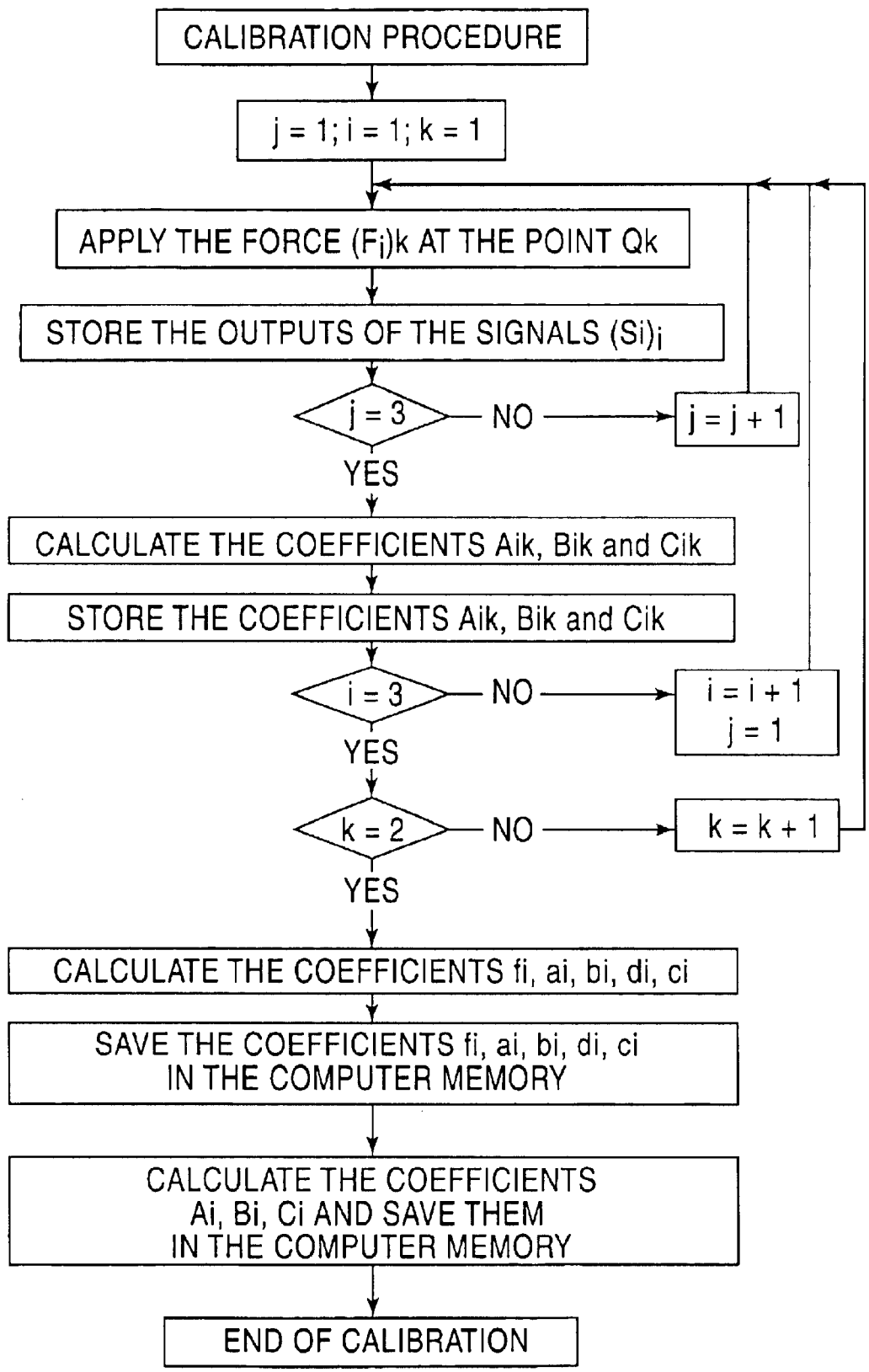

In a second step, depicted according to a first and a second embodiment respectively in FIGS. 4 and 5, the parameters $A_i$, $B_i$, $C_i$ with i=1 to 3 are determined.

According to the first embodiment, three given forces $F_1$, $F_2$ and $F_3$ are applied successively at an interface $Q_1$, said forces having as components in the reference frame (X, Y, Z) respectively $(F_{x1}, F_{y1}, F_{z1})$, $(F_{x2}, F_{y2}, F_{z2})$, $(F_{x3}, F_{y3}, F_{z3})$.

For each of the signals $S_i$, i=1 to 3, the system (S) is then written:

$$\begin{bmatrix} F_{x1} & F_{y1} & F_{z1} \\ F_{x2} & F_{y2} & F_{z2} \\ F_{x3} & F_{y3} & F_{z3} \end{bmatrix} \times \begin{bmatrix} A_i \\ B_i \\ C_i \end{bmatrix} = \begin{bmatrix} (S_i)_{F1} - k_i \\ (S_i)_{F2} - k_i \\ (S_i)_{F3} - k_i \end{bmatrix}$$

or:

-continued $$\begin{bmatrix} A_i \\ B_i \\ C_i \end{bmatrix} = \begin{bmatrix} F_{x1} & F_{y1} & F_{z1} \\ F_{x2} & F_{y2} & F_{z2} \\ F_{x3} & F_{y3} & F_{z3} \end{bmatrix}^{-1} \times \begin{bmatrix} (S_i)_{F1} - k_i \\ (S_i)_{F2} - k_i \\ (S_i)_{F3} - k_i \end{bmatrix}$$

that is to say:

$$\begin{bmatrix} A_i \\ B_i \\ C_i \end{bmatrix} = \frac{1}{\det(T)} \begin{bmatrix} (F_{y2}F_{z3} - F_{y3}F_{z2}) & (F_{y3}F_{z1} - F_{y1}F_{z3}) & (F_{y1}F_{z2} - F_{y2}F_{z1}) \\ (F_{x2}F_{z3} - F_{x3}F_{z2}) & (F_{x1}F_{z3} - F_{x3}F_{z1}) & (F_{x2}F_{z1} - F_{x1}F_{z2}) \\ (F_{x2}F_{y3} - F_{x3}F_{y2}) & (F_{x3}F_{y1} - F_{x1}F_{y3}) & (F_{x1}F_{y2} - F_{x2}F_{y1}) \end{bmatrix} \begin{bmatrix} (S_i)_{F1} - k_i \\ (S_i)_{F2} - k_i \\ (S_i)_{F3} - k_i \end{bmatrix}$$

with $\det(T) = F_{x1}F_{y2}F_{z3} + F_{x2}F_{y3}F_{z1} + F_{x3}F_{y1}F_{z2} - F_{x3}F_{y2}F_{z1} - F_{x1}F_{y3}F_{z2} - F_{x2}F_{y1}F_{z3}$ and $(S_i)_{Fj}$ is the signal $S_i$ induced by the force $F_j$, i and j being between 1 and 3.

By solving the system (S) thus posed, the value of the parameters $A_i$, $B_i$, $C_i$ with i=1 to 3 is therefore obtained directly.

Thus, these parameters can be stored in the computer so as to be able, during the processing procedure, to directly calculate the forces $F_{xw}$, $F_{yw}$, $F_{zw}$ from the measurements of $S_1$, $S_2$, $S_3$ by solving the system (S), iteratively.

According to this embodiment, the calculated forces $F_{xw}$, $F_{yw}$, $F_{zw}$ are independent of the position of the interface Q which is therefore considered to be identical to that of $Q_1$. This embodiment therefore applies typically to either the case where the revolving element 1 is indeformable under the effect of the forces $F_{xw}$, $F_{yw}$, $F_{zw}$, or the case where the revolving element 1 is substantially indeformable so that the force variations induced by the displacement of the interface Q are considered to be negligible in the application under consideration, for example on account of a high measurement accuracy not being required or the forces exerted on the revolving element 1 not being very large.

In the contrary case, the method according to the invention makes it possible, in the calculation of the forces $F_{xw}$, $F_{yw}$, $F_{zw}$, to take account, at least partially, of the deformations of the revolving element 1 which are induced by the forces $F_{xw}$, $F_{yw}$, $F_{zw}$.

Figure 2:
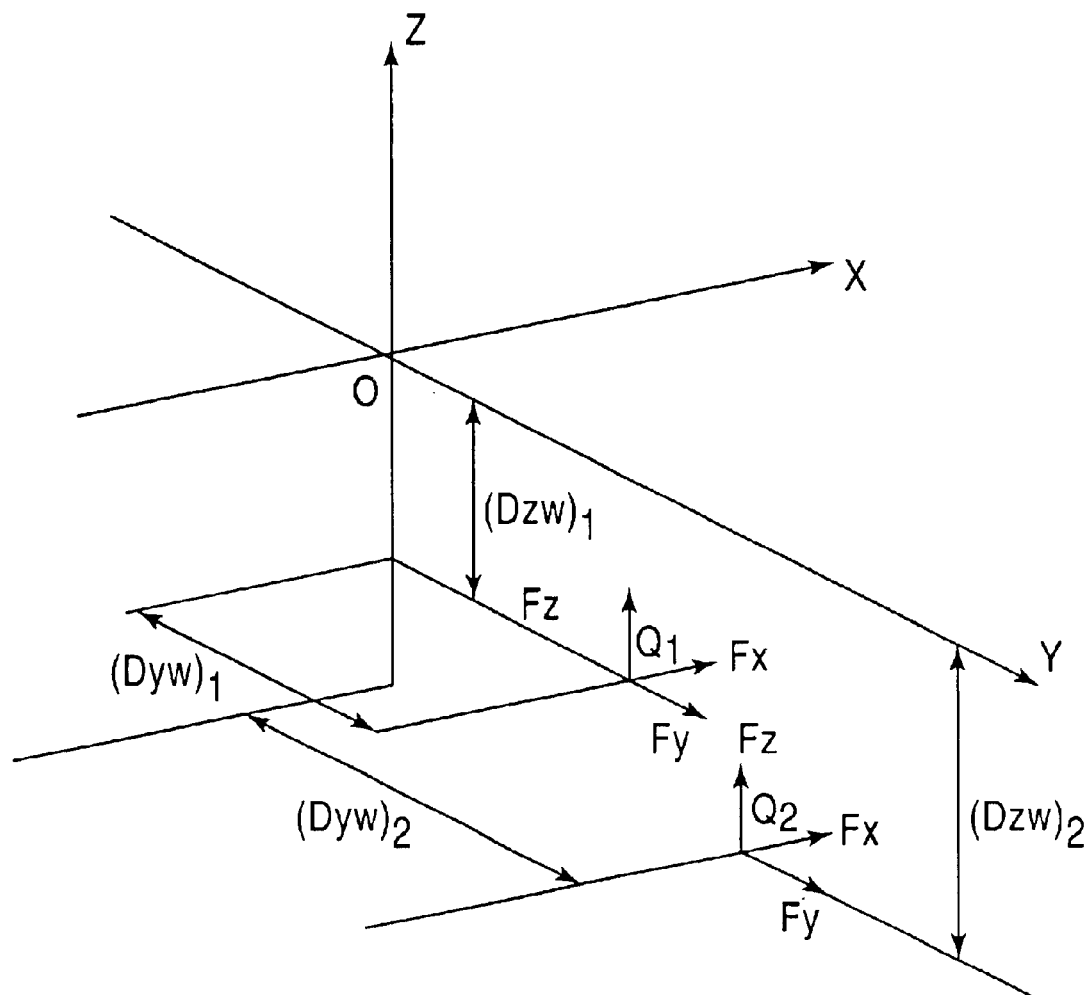
FIG. 2 is a diagram showing the reference frames associated with two interfaces of contact between the revolving element and the support.

To that end, and according to the second embodiment of the second step of the calibration procedure depicted in FIG. 5, provision is made to apply at a given interface $Q_2$ (see FIG. 2) three forces F'1, F'2 and F'3 so as to obtain, in a manner similar to that presented within the context of the first embodiment, the parameters Ai, Bi, Ci which correspond to the interface $Q_2$.

Thus, and in view of the fact that:

$$A_i = (a_i + f_i \times D_{yw})$$

$$B_i = (b_i + d_i \times D_{zw})$$

$$C_i = (c_i - d_i \times D_{yw})$$

the following are obtained:

$$f_i = \frac{(A_i)_1 - (A_i)_2}{(D_{yw})_1 - (D_{yw})_2}$$

$$a_i = (A_i)_1 - f_i \times (D_{yw})_1$$

$$d_i = \frac{(B_i)_1 - (B_i)_2}{(D_{zw})_1 - (D_{zw})_2}$$

$$b_i = (B_i)_1 - d_i \times (D_{zw})_1$$

$$c_i = (C_i)_1 - d_i \times (D_{yw})_1$$

The indices 1 and 2 correspond respectively to the parameters $A_i$, $B_i$, $C_i$ and to the positions $D_{yw}$ and $D_{zw}$ for the interfaces $Q_1$ and $Q_2$.

There are therefore obtained by calculation the constants $f_i$, $a_i$, $d_i$, $b_i$, $c_i$ which are independent of the position of the interface under consideration.

Thus, by saving these constants in the computer, a method of calculating the forces $F_{xw}$, $F_{yw}$, $F_{zw}$ can be obtained which takes account of the variation of the position of the interface Q under the effect of said forces.

Figure 6:
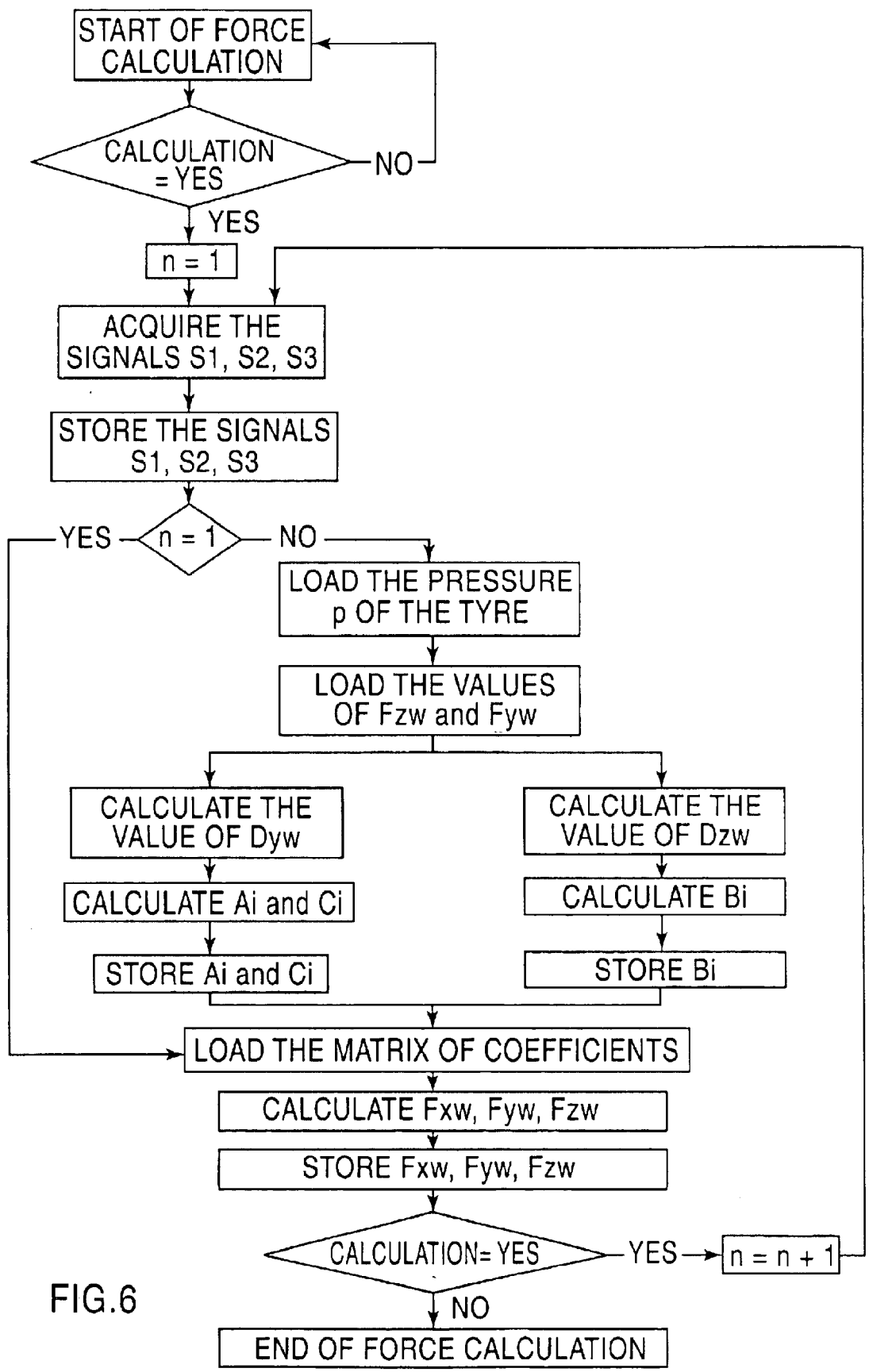
FIGS. 6 to 8 are overview diagrams of respectively first, second and third embodiments of the processing procedure.

In connection with FIG. 6, a description is given of a first embodiment of such an iterative procedure for processing the signals $S_1$, $S_2$, $S_3$.

After the calibration procedure, the signals $S_1$, $S_2$, $S_3$ are measured and then stored in the computer.

During the first iteration (n=1), the parameters $A_i$, $B_i$, $C_i$ stored during the calibration procedure are used to calculate $F_{xw}$, $F_{yw}$, $F_{zw}$ by solving the system (S) as indicated above.

Next (when n>1), at each iteration, at least one, for example two in the embodiment depicted in FIG. 6, displacement coordinate of the interface Q is calculated. In a variant, this calculation can be performed according to a different periodicity as a function of the specific constraints of the application under consideration.

To that end, a deformation model of the revolving element 1 is stored in the computer so as to know, for each value of $F_{xw}$, $F_{yw}$, $F_{zw}$, the induced deformation of the revolving element 1. To that end, storage of a deformation model at the time the vehicle is put into service and optionally the ability to change it if a very different type of tyre 1 is used subsequently can be envisaged.

Figure 3:
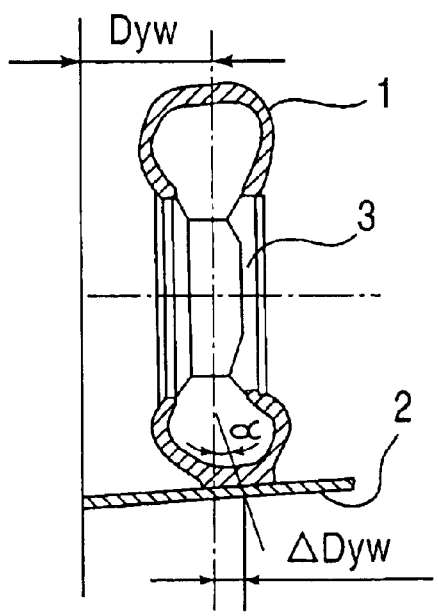
FIG. 3 depicts in cross-section the deformation of a tyre under the effect of an exerted force.

In particular, in the case of a tyre, the displacement $\Delta D_{yw}$ of the interface Q can be estimated by $R/2 \tan(\alpha)$, R being the radius of the tyre 1 and $\alpha$ being its so-called drift angle (see FIG. 3) and, for a given tyre 1, the variation of $\alpha$ as a function of the ratio $F_{yw}/F_{zw}$ is known for a given pressure $\rho$ in the tyre.

Thus, it is possible to calculate $\Delta D_{yw}$ as a function of the ratio $F_{yw}/F_{zw}$ calculated during the previous iteration.

Furthermore, still in the case of a given tyre, and on the basis of the measurement of the pressure $\rho$, the displacement $\Delta D_{zw}$ which corresponds to the variation of the radius of the tyre 1 is also known as a function of the forces $F_{xw}$, $F_{yw}$, $F_{zw}$.

Thus it is possible, after the first iteration and the measurement of the pressure $\rho$, to calculate $\Delta D_{yw}$ and $\Delta D_{zw}$, to add them respectively to $D_{yw}$ and $D_{zw}$, to calculate the new parameters $A_i$, $B_i$, $C_i$ which correspond to this new interface ($A_i$, $C_i$ being a function solely of $D_{yw}$ and $B_i$ being solely a function of $D_{zw}$), to store these new parameters and then to calculate, with them, the new forces $F_{xw}$, $F_{yw}$, $F_{zw}$ corresponding to the measured signals $S_1$, $S_2$, $S_3$.

Thus, the method makes it possible, continuously, to take account of the displacements of the interface Q induced by the forces $F_{xw}$, $F_{yw}$, $F_{zw}$, so as to improve the reliability over time of the calculations obtained.

In a variant, and according to the specific constraints of the application under consideration, it is possible to take account only of the displacement in one direction, namely $\Delta D_{yw}$ or $\Delta D_{zw}$, so as to recalculate respectively only the parameters $A_i$, $C_i$ or $B_i$, or else to provide a different calculation periodicity for these two types of parameter.

According to another variant, provision can be made to compare the values of $\Delta D_{yw}$ and/or $\Delta D_{zw}$ with respectively the values of $D_{yw}$ and/or $D_{zw}$ so as to initiate the recalculation of the corresponding parameters $A_i$, $C_i$ or $B_i$ only if the coordinate variations are above a certain threshold.

Figure 7:
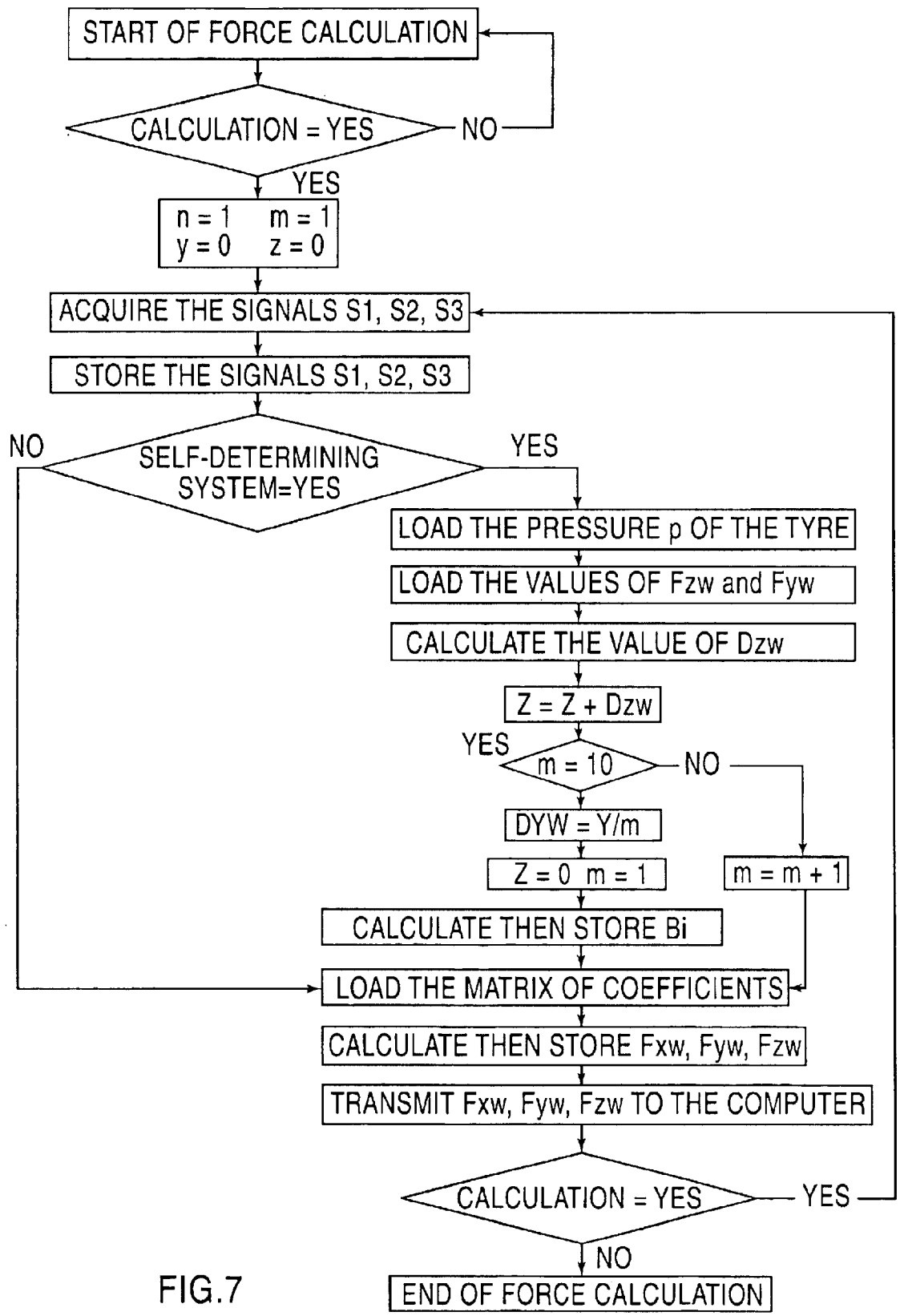

The embodiment depicted in FIG. 7 differs from that of FIG. 6 in that the method makes provision only to continuously recalculate the parameter $B_i$, said calculation being reiterated ten times and then averaged before being used for calculation of the forces $F_{xw}$, $F_{yw}$, $F_{zw}$ during the subsequent ten iterations, so as to improve the accuracy of said calculation.

Figure 8:
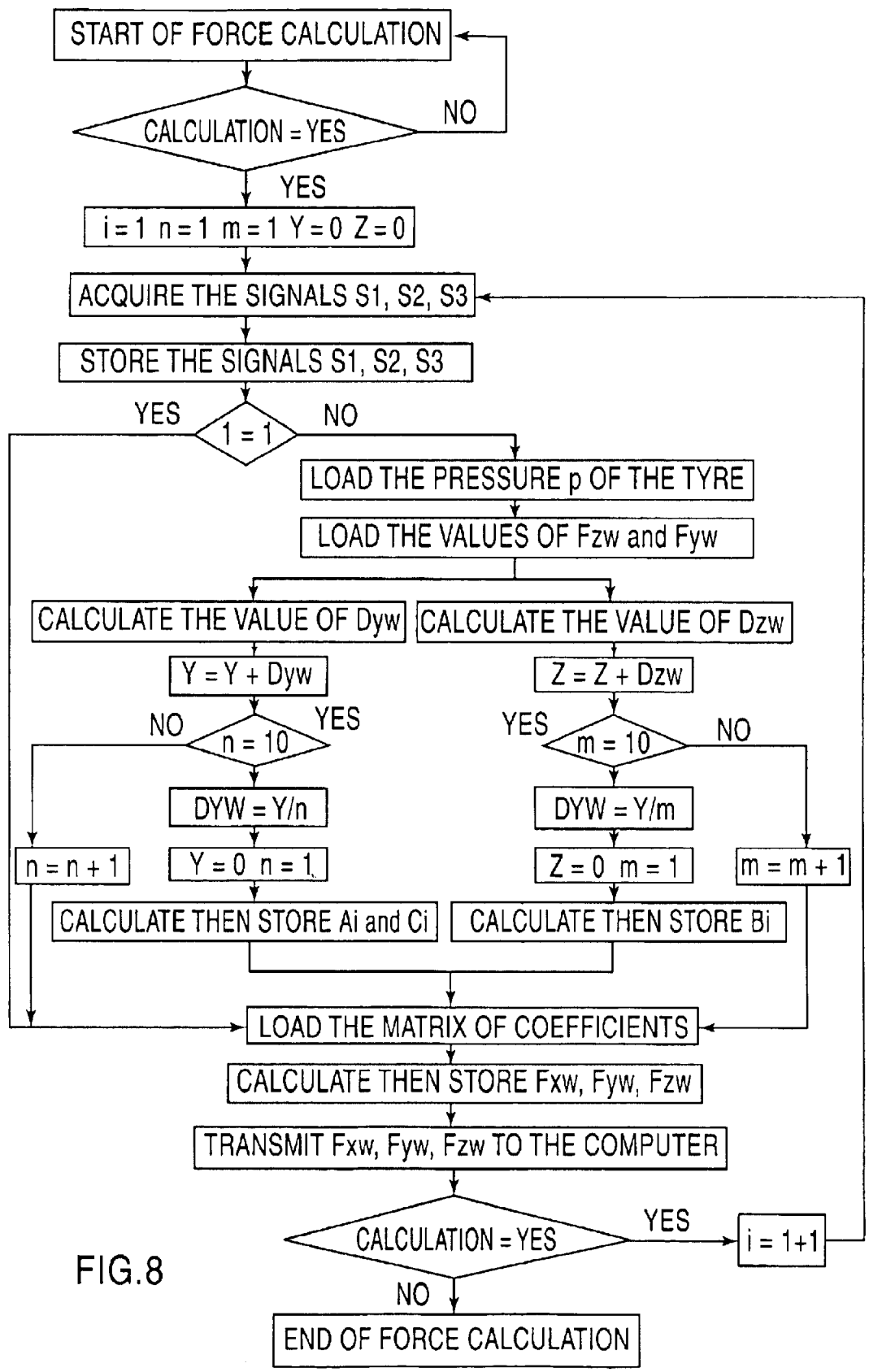

The embodiment depicted in FIG. 8 differs from that of FIG. 7 in that the method also makes provision to continuously recalculate the parameters $A_i$, $C_i$, said calculations being reiterated ten times and then averaged before being used for calculation of the forces $F_{xw}$, $F_{yw}$, $F_{zw}$ during the subsequent ten iterations, so as to further improve the accuracy of said calculation.

The invention also makes it possible to calculate the moments $M_x$ and $M_z$ at the point O by means of the following formulae:

$$M_x = F_{zw} \times D_{yw} + F_{yw} \times D_{zw}$$

$$M_z = F_{xw} \times D_{yw}$$

What is claimed is:

1. A method of calculating the forces ($F_{xw}$, $F_{yw}$, $F_{zw}$) applied at an interface (Q) between a revolving element (1) and a support (2) on which said element revolves about an axis Y, said element being associated with a rotating race of a bearing so as to revolve jointly therewith, said method using a set of fixed sensors capable of delivering three independent signals ($S_1$, $S_2$, $S_3$) representative of the forces being applied on the fixed race of the bearing and which result from the forces ($F_{xw}$, $F_{yw}$, $F_{zw}$), said method comprising:

an iterative processing procedure providing the following steps:

acquisition of the signals ($S_1$, $S_2$, $S_3$);

solving of the system (S) $S_i = (A_i \times F_{xw}) + (B_i \times F_{yw}) + (C_i \times F_{zw}) + K_i$ with I=1 to 3 so as to obtain the values of the forces $F_{xw}$, $F_{yw}$ and $F_{zw}$) corresponding to each acquisition; and a calibration procedure which is carried out before the first iteration of the processing procedure and which provides the following steps:

determination of the constants $K_i$;

application at a given interface ($Q_1$) of successively three given forces ($F_1$, $F_2$, $F_3$), so as to determine, by acquisition of the signals ($S_i$) and solving of the corresponding systems (S), parameters $A_i$, $B_i$, and $C_i$.

2. A method according to claim 1, characterised in that the calibration procedure also comprises the following steps:

application at a given interface ($Q_2$) of successively three given forces ($F'_1$, $F'_2$, $F'_3$), so as to determine, by acquisition of the signals ($S_i$) and solving of the corresponding systems (S), the parameters $A_i$, $B_i$ and $C_i$ which apply to the interface ($Q_2$);

determination of the calculation constants of the parameters $A_i$, $B_i$ and $C_i$ which are independent of the coordinates of the interface (Q).

3. A method according to claim 1 or 2, characterised in that the determination of the constants $k_i$ is carried out under zero force.

4. A method according to claim 3, characterised in that the constants $k_i$ are set to zero by adjustment of the offset of the sensors.

5. A method according to claim 2, characterised in that, during the processing procedure, at least one displacement coordinate of the interface (Q) is calculated periodically from a deformation model of the revolving element (1) as a function of the calculated forces ($F_{xw}$, $F_{yw}$, $F_{zw}$).

6. A method according to claim 5, characterised in that, during the processing procedure, at least one of the parameters $A_i$, $B_i$ and $C_i$ is calculated by means of the at least one calculated displacement coordinate.

7. A method according to claim 6, characterised in that the at least one of the calculated parameters $A_i$, $B_i$ and $C_i$ is used for solving the system (S).

8. A method according to claim 6, characterised in that the calculation of the at least one of the parameters $A_i$, $B_i$ and $C_i$ is averaged over a number of measurements so as to use said average in the solving of the system (S).

9. Application of a method according to any one of claims 5 to 8, to the calculation of forces ($F_{xw}$, $F_{yw}$, $F_{zw}$) applied on a tyre of a motor vehicle, said tyres revolving on a road.

10. Application according to claim 9, characterised in that the deformation model of the tyre is determined in particular as a function of the pressure ($_p$) measured in said tyre.

11. Application according to claim 9, characterised in that the forces ($F_{xw}$, $F_{yw}$, $F_{zw}$) are used in at least one driver assist system of the motor vehicle.

12. Application of a method according to any one of claim 1 or 2, to the calculation of forces ($F_{xw}$, $F_{yw}$, $F_{zw}$) applied on a tyre of a motor vehicle, said tyres revolving on a road.

13. Application of a method according to claim 3, to the calculation of forces ($F_{xw}$, $F_{yw}$, $F_{zw}$) applied on a tyre of a motor vehicle, said tyres revolving on a road.

14. Application of a method according to claim 4, to the calculation of forces ($F_{xw}$, $F_{yw}$, $F_{zw}$) applied on a tyre of a motor vehicle, said tyres revolving on a road.

15. Application according to claim 11, characterised in that the forces ($F_{xw}$, $F_{yw}$, $F_{zw}$) are used in at least one driver assist system of the motor vehicle.

* * * * *